(12) United States Patent
Trapani et al.

(10) Patent No.: US 12,333,875 B2
(45) Date of Patent: *Jun. 17, 2025

(54) MULTIMODAL ELECTRONIC LOCKING DEVICE AND SYSTEM

(71) Applicant: Security Enhancement Systems, LLC, Northbrook, IL (US)

(72) Inventors: Matthew Frank Trapani, Deerfield, IL (US); Scott Trail, Northbrook, IL (US)

(73) Assignee: Security Enhancement Systems, LLC, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/596,201

(22) Filed: Mar. 5, 2024

(65) Prior Publication Data

US 2024/0290152 A1 Aug. 29, 2024

Related U.S. Application Data

(63) Continuation of application No. 17/671,587, filed on Feb. 14, 2022, now Pat. No. 11,922,744.

(Continued)

(51) Int. Cl.
*H04W 12/06* (2021.01)
*B60R 25/24* (2013.01)
(Continued)

(52) U.S. Cl.
CPC .......... *G07C 9/00309* (2013.01); *B60R 25/24* (2013.01); *G07C 9/21* (2020.01);
(Continued)

(58) Field of Classification Search
CPC ......... B60R 25/24; B60R 25/04; B60R 25/10; B60R 25/245; B60R 25/252; G07C 2009/00769; G07C 9/00174; G07C 9/00309; G07C 9/00563; G07C 9/00571; G07C 9/21; G07C 9/26; G07C 9/28; G07C 9/00896; H04W 4/80; H04W 12/06; H04W 4/02; H04W 4/38; H04W 4/50;

(Continued)

(56) References Cited

U.S. PATENT DOCUMENTS

| | | | |
|---|---|---|---|
| 9,767,318 B1 * | 9/2017 | Dropps | G06F 21/72 |
| 2020/0331431 A1 * | 10/2020 | Fushimi | B60R 25/24 |
| 2021/0065855 A1 * | 3/2021 | Pepin | G16H 20/40 |

* cited by examiner

*Primary Examiner* — Dionne Pendleton
(74) *Attorney, Agent, or Firm* — Gregory Finch; Finch Paolino, LLC

(57) ABSTRACT

An integrated electronic locking system and electronic locking device configured to enable electronic access control of an integrated electronic locking device via multiple electronic access modalities across multiple user types/roles. An object of the present disclosure is an integrated electronic locking system configured to enable a system administrator to configure different access control parameters for two or more different access control modalities/types across two or more different users and/or use cases. In accordance with certain embodiments, an integrated electronic locking system comprises an integrated electronic locking device communicably engaged with a remote server over a wireless or wireline communications interface to enable one or more operations of an integrated electronic access control method.

20 Claims, 10 Drawing Sheets

Related U.S. Application Data

(60) Provisional application No. 63/172,182, filed on Apr. 8, 2021, provisional application No. 63/164,533, filed on Mar. 22, 2021.

(51) Int. Cl.
  *G07C 9/00* (2020.01)
  *G07C 9/21* (2020.01)
  *G07C 9/28* (2020.01)
  *H04W 4/80* (2018.01)

(52) U.S. Cl.
  CPC .............. *G07C 9/28* (2020.01); *H04W 4/80* (2018.02); *G07C 2009/00769* (2013.01)

(58) Field of Classification Search
  CPC ... H04L 63/0861; H04L 63/102; H01Q 1/243; H01Q 1/3241; H01Q 1/42; G16H 10/60; G16H 20/10; G16H 20/30; G16H 20/40; G16H 40/63; G16H 40/67; G08B 25/008; G06V 40/1347; G06V 40/1365; G06Q 20/227; G06Q 20/32; G06Q 20/326; G06Q 20/3274; G06Q 20/3276; G06Q 20/3278; G06Q 20/34; G06Q 20/351; G06Q 20/36; G06Q 20/40; G06Q 20/401; G06Q 20/40145; G05D 1/0055; G05D 1/0234; G05B 19/042; G05B 19/0425; G05B 19/048; G05B 19/406; G05B 19/41895; G05B 2219/31003; G01V 8/10; G01V 8/20; G01S 17/04; G01S 17/08; G01S 17/58; F02N 11/087; B65G 1/0492; B65G 1/065; B65G 1/1375; B63C 11/22; B63C 11/2245; B63C 11/30; B25J 9/1676; B25J 9/1697; A61N 1/36128; A61N 1/37247; A61N 1/37254; A61N 1/37264; A61N 1/37282; G06F 21/6245; G06F 21/32; G06F 21/44; G06F 21/57; G06F 21/629; G06F 21/72; G06F 3/0482; G06F 3/0483; G06F 3/0484; G06F 8/65
  See application file for complete search history.

MULTIMODAL ELECTRONIC LOCKING DEVICE AND SYSTEM

CROSS-REFERENCE TO RELATED APPLICATIONS

This application is a continuation of U.S. application Ser. No. 17/671,587 filed on Feb. 14, 2022, which claims the benefit of U.S. Provisional Application Ser. No. 63/164,533, filed on Mar. 22, 2021, entitled "MULTIMODAL ELECTRONIC LOCKING DEVICE AND SYSTEM," and U.S. Provisional Application Ser. No. 63/172,182, filed on Apr. 8, 2021, entitled "MULTIMODAL ELECTRONIC LOCKING DEVICE AND SYSTEM"; the disclosures of each of which are hereby incorporated herein in their entireties at least by virtue of this reference.

FIELD

The present disclosure relates to the field of electronic locking devices and systems; in particular, an electronic locking device and system configured to support multiple electronic access control modalities in a single electronic locking device.

BACKGROUND

There are many types of electronic access control locking devices that protect remote site shelters and enclosures as well as other commercial and home environments. In general, there are two primary categories of electronic locking devices: Keyed and Keyless. Electronic keyed locking devices typically consist of a lock, electronic locking cylinder, electronic key and key configuration device. Electronic keyless locking devices typically consist of an electronic lock operably engaged with an optional keypad, card reader, bio sensing device, and/or wireless communications interface to send and receive credential and other access information. (e.g., WiFi, Cellular, LORA, BLE, Bluetooth Classic, NFC, RFID, mesh networks, etc.). Given the size and cost constraints of these types of electronic locking solutions, electronic locking devices typically utilize a single type of primary electronic locking method/modality and do not support integrated access control across a plurality of different access control devices.

Through applied effort, ingenuity, and innovation, Applicant has identified a number of deficiencies and problems with keyed and keyless electronic locking devices and systems. Applicant has developed a solution that is embodied by the present invention, which is described in detail below.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

An aspect of the present disclosure is an electronic access control apparatus, comprising an electronic lock cylinder operably engaged with a power source, the electronic lock cylinder comprising a locking mechanism configured to be selectively engaged between a locked state and an unlocked state; a controller operably engaged with the electronic lock cylinder to command the locking mechanism between the locked state and the unlocked state, the controller comprising at least one wireless communications interface, at least one near field communications interface, an electronic key interface, a processor and a non-transitory computer readable medium comprising instructions stored thereon that, when executed, command the processor to perform one or more operations, the one or more operations comprising receiving a first access request via the at least one wireless communications interface, wherein the first access request comprises a first access request type; receiving a second access request via the at least one near field communications interface, wherein the second access request comprises a second access request type; receiving a third access request via the electronic key interface, wherein the third access request comprises a third access request type; processing one or more of the first access request, the second access request and the third access request to authenticate an authorized electronic access code, an authorized user role and an authorized access request type according to one or more configuration settings; and actuating the electronic lock cylinder to the unlocked state in response to successfully authenticating the authorized electronic access code, the authorized user role and the authorized access request type according to the one or more configuration settings.

In accordance with certain aspects of the electronic access control apparatus of the present disclosure, the one or more operations may further comprise receiving an alternative access request comprising an alternative access request type in response to unsuccessfully authenticating one or more of the authorized electronic access code, the authorized user role and the authorized access request type. In certain embodiments, the one or more configuration settings may comprise configurations for linking one or more user roles with one or more access request types. In certain embodiments, the one or more configuration settings may comprise configurations for linking one or more access event types with the one or more user roles and the one or more access request types. In certain embodiments, the one or more operations may further comprise simultaneously receiving two or more of the first access request, the second access request and the third access request. In certain embodiments, the one or more operations may further comprise processing the two or more of the first access request, the second access request and the third access request to authenticate the authorized electronic access code, the authorized user role and the authorized access request type according to the one or more configuration settings. In accordance with certain aspects of the electronic access control apparatus, the one or more operations may further comprise receiving a biometric input from a biometric sensor, wherein the biometric input comprises a fourth access request type.

Another aspect of the present disclosure is an electronic access control system, comprising an electronic lock cylinder operably engaged with a power source, the electronic lock cylinder comprising a locking mechanism configured to be actuated between a locked state and an unlocked state; a controller operably engaged with the electronic lock cylinder to actuate the locking mechanism between the locked state and the unlocked state, the controller comprising at least one wireless communications interface, at least one near field communications interface and an electronic key interface; and an electronic key communicably engaged with the controller via the electronic key interface, wherein the controller comprises a processor and a non-transitory computer readable medium comprising instructions stored thereon that, when executed, command the processor to perform one or more operations, the one or more operations comprising receiving a first access request from a mobile electronic device via the at least one wireless communications interface, wherein the first access request comprises a first access request type; receiving a second access request from a near field communication-enabled device via the at least one near field communications interface, wherein the second access request comprises a second access request type; receiving a third access request from the electronic key via the electronic key interface, wherein the third access request comprises a third access request type; processing one or more of the first access request, the second access request and the third access request to authenticate an authorized electronic access code, an authorized user role and an authorized access request type according to one or more configuration settings; and actuating the electronic lock cylinder to the unlocked state in response to successfully authenticating the authorized electronic access code, the authorized user role and the authorized access request type according to the one or more configuration settings.

In accordance with certain embodiments, the electronic key may be operably engaged with the controller to configure the one or more configuration settings in response to an input from the electronic key. In certain embodiments, the electronic key may be operably engaged with the controller to override the one or more configuration settings in response to an input from the electronic key. In accordance with certain aspects of the electronic access control system, the one or more configuration settings may comprise configurations for linking one or more user roles with one or more access request types. In accordance with certain aspects of the electronic access control system, the one or more configuration settings may comprise configurations for linking one or more access event types with the one or more user roles and the one or more access request types. In certain embodiments, the electronic key may be operably engaged with the controller to update a firmware of the controller in response to an input from the electronic key. In accordance with certain aspects of the electronic access control system, the one or more operations further comprise receiving a biometric input from a biometric sensor, wherein the biometric input comprises a fourth access request type.

Still further aspects of the present disclosure provide for an electronic access control method, comprising configuring, with an input device communicably engaged with a controller of an electronic access control device, one or more configuration settings comprising configurations for one or more user roles, one or more access request types and one or more access event types associated with the electronic access control device; receiving, with the controller of the electronic access control device via at least one wireless communications interface, a first access request from a mobile electronic device, wherein the first access request comprises a first access request type; receiving, with the controller of the electronic access control device via at least one near field communications interface, a second access request from a near field communication-enabled device, wherein the second access request comprises a second access request type; receiving, with the controller of the electronic access control device via an electronic key interface, a third access request from an electronic key, wherein the third access request comprises a third access request type; processing, with the controller of the electronic access control device, one or more of the first access request, the second access request and the third access request to authenticate an authorized electronic access code, an authorized user role and an authorized access request type for the electronic access control device according to the one or more configuration settings; and actuating, with the controller of the electronic access control device, the electronic access control device from a locked state to an unlocked state in response to successfully authenticating the authorized electronic access code, the authorized user role and the authorized access request type according to the one or more configuration settings.

In accordance with certain aspects of the present disclosure, the electronic access control method may further comprise updating a firmware of the controller of the electronic access control device in response to receiving, with the controller of the electronic access control device, at least one input from the electronic key. In certain embodiments, the one or more configuration settings comprise configurations for linking one or more user roles with one or more access request types. In certain embodiments, the one or more configuration settings may comprise configurations for linking one or more access event types with the one or more user roles and the one or more access request types. In accordance with certain aspects of the present disclosure, the electronic access control method may further comprise receiving, with the controller of the electronic access control device, an alternative access request comprising an alternative access request type in response to unsuccessfully authenticating one or more of the authorized electronic access code, the authorized user role and the authorized access request type. In accordance with certain aspects of the present disclosure, the electronic access control method may further comprise receiving, with the controller of the electronic access control device, a biometric input from a biometric sensor, wherein the biometric input comprises a fourth access request type.

The foregoing has outlined rather broadly the more pertinent and important features of the present invention so that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent structures do not depart from the spirit and scope of the invention as set forth in the appended claims.

BRIEF DESCRIPTION OF DRAWINGS

The skilled artisan will understand that the figures, described herein, are for illustration purposes only. It is to be understood that in some instances various aspects of the described implementations may be shown exaggerated or enlarged to facilitate an understanding of the described implementations. In the drawings, like reference characters generally refer to like features, functionally similar and/or structurally similar elements throughout the various drawings. The drawings are not necessarily to scale, emphasis instead being placed upon illustrating the principles of the teachings. The drawings are not intended to limit the scope of the present teachings in any way. The system and method may be better understood from the following illustrative description with reference to the following drawings in which.

DETAILED DESCRIPTION

Figure 1:
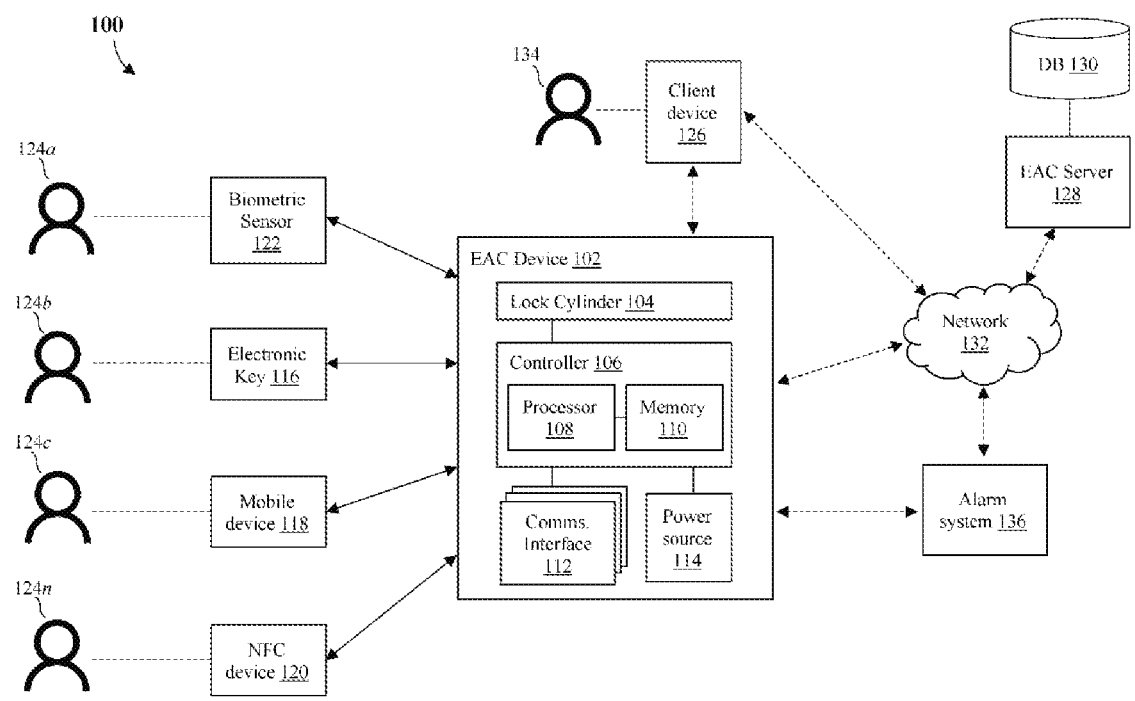
FIG. 1 is an architecture diagram of a multimodal EAC system in accordance with certain aspects of the present disclosure.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout. All definitions, as defined and used herein, should be understood to control over dictionary definitions, definitions in documents incorporated by reference, and/or ordinary meanings of the defined terms.

Following below are more detailed descriptions of various concepts related to, and embodiments of, inventive methods, devices and systems configured to provide for an integrated electronic locking system and electronic locking device configured to enable electronic access control of an integrated electronic locking device via multiple electronic access modalities across multiple user types. An integrated electronic locking system of the present disclosure may be configured to enable a system administrator to configure different access control parameters for two or more different access control modalities/types across two or more different users and/or use cases. In accordance with certain embodiments, an integrated electronic locking system comprises an integrated electronic locking device communicably engaged with a remote server over a wireless or wireline communications interface to enable one or more operations of an integrated electronic access control method.

It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes. The present disclosure should in no way be limited to the exemplary implementation and techniques illustrated in the drawings and described below.

Where a range of values is provided, it is understood that each intervening value, to the tenth of the unit of the lower limit unless the context clearly dictates otherwise, between the upper and lower limit of that range and any other stated or intervening value in that stated range is encompassed by the invention. The upper and lower limits of these smaller ranges may independently be included in the smaller ranges, and are also encompassed by the invention, subject to any specifically excluded limit in a stated range. Where a stated range includes one or both of the endpoint limits, ranges excluding either or both of those included endpoints are also included in the scope of the invention.

As used herein, "exemplary" means serving as an example or illustration and does not necessarily denote ideal or best.

As used herein, the term "includes" means includes but is not limited to, the term "including" means including but not limited to. The term "based on" means based at least in part on.

As used herein, the term "interface" refers to any shared boundary across which two or more separate components of a computer system may exchange information. The exchange can be between software, computer hardware, peripheral devices, humans, and combinations thereof. The term "interface" may be further defined as any shared boundary or connection between two dissimilar objects, devices or systems through which information or power is passed and/or a mechanical, functional and/or operational relationship is established and/or accomplished. Such shared boundary or connection may be physical, electrical, logical and/or combinations thereof.

Certain objects and advantages of the present disclosure include an integrated electronic locking system and electronic locking device configured to enable electronic access control of an integrated electronic locking device via multiple electronic access modalities across multiple user types.

Exemplary devices, methods and systems of the present disclosure provide for an integrated electronic access control method comprising one or more process steps or operations for providing access to an integrated electronic locking device. An integrated electronic access control method of the present disclosure may comprise a software application or program comprising one or more static or dynamic configurations and/or parameters to define two or more variables for accessing an integrated electronic locking device (e.g., who, when, where, why and how the point of access can be used depending on the use case). For example, a first access control modality (e.g., an electronic key card) may be configured to provide access to an integrated electronic locking device for a first user role (e.g., an employee); and a second access control modality (e.g., a wireless communication signal) may be configured to provide access to an integrated electronic locking device for a second user role (e.g., a third-party vendor).

In accordance with certain aspects of the present disclosure, an integrated electronic locking system may comprise an integrated electronic locking device. The integrated electronic locking device may comprise an electronic lock configured to selectively secure and restrict access to a door, entrance and/or access point for a secured location or enclosure and may comprise, for example, a door lock, a panel lock, a portable security product, such as a puck lock, sliding bolt, padlock, Mortise, or electronic cylinder, and the like. The integrated electronic locking device may be communicably engaged with a remote server via a communications interface. The integrated electronic locking device may be configured to receive an electronic access request from one or more electronic access control devices comprising one or more electronic access control modalities associated with one or more disparate user roles/types. In accordance with certain aspects of the present disclosure, the integrated electronic locking system may comprise one or more electronic access control devices comprising a mobile electronic device, a keypad interface, an RFID fob or key card, a biometric interface and/or other electronic access control modality. In accordance with certain embodiments, each of the one or more electronic access control devices may be associated with a different user role/user permission in the integrated electronic locking system. For example, a mobile electronic device may be associated with an authorized visitor/guest of a secured location; a keypad interface may be associated with access to a specific sub-location with the secured location; an RFID fob or key card may be associated with an employee of the secured location; and a mobile electronic device may be associated with a known third-party vendor or supplier for the secured location. The system may further comprise one or more biometric authentication means communicably engaged with the integrated electronic locking device to authenticate an authorized user of the system and grant access to the integrated electronic locking device. In accordance with certain embodiments, different levels of biometric authentication may be associated with different degrees of security and/or different access permissions. For example, a first user role may comprise a biometric identification comprising a fingerprint scan and a second user role may comprise a combination of a fingerprint scan and a facial recognition. In accordance with various embodiments, the biometric authentication means may comprise one or more of fingerprint recognition, facial recognition, voice recognition, iris recognition, retina scan, keystroke dynamics, signature recognition and combinations thereof and the like.

In accordance with certain aspects of the present disclosure, the integrated electronic locking device may comprise a locking device (for example, a puck luck) comprising an electronic cylinder operably engaged with a controller comprising a wireless communications interface, such as BLUETOOTH or near-field communication (NFC). The integrated electronic locking device may comprise a wireless BLUETOOTH Low-Energy (BLE) interface configured to communicate with certain types of mobile electronic devices (such as a BLE fob). The integrated electronic locking device may comprise a built-in electronic cylinder configured to enable electronic key override capabilities and NFC for certain types of electronic access control devices.

In accordance with certain aspects of the present disclosure, a remote server may comprise a computer program product, software and/or user application comprising a plurality of processor-executable instructions for an integrated electronic access control method. The remote server may be operably engaged with the integrated electronic locking device to configure/provision one or more access control parameters and user permissions for one or more electronic access control devices associated with one or more authorized users. In accordance with certain embodiments, the remote server may be communicably engaged with one or more enterprise backend user/site data and alarm systems in order to ensure that each user, site and alarm can be remotely managed within the integrated electronic locking system.

Certain embodiments of the present disclosure may be implemented across various illustrative use cases, including but not limited to:

Electronic key use for firmware updates, locking device configuration and key override capabilities for software or hardware component failures;

BLE for a skeleton key useful for various types of locking devices that may or may not have an electronic cylinder, keypad, card swipe, bio sensor, etc. In this case, the BLE is an umbrella skeleton key that can access any and all electronic devices capable of multiple points of access;

Any one or more of each point of access can be configured depending on the role of the user and nature of the reason for access;

Extra layers of security so that if it is a critical site to unlock, it can require an electronic key, BLE on a mobile device and an NFC fob all at one time (i.e., the software can configure which type of user can use which type of access method for different types of access scenarios);

Flexible access across various users and device types to provide for multi-modal electronic access control in an emergency or catastrophe; and Flexible access across various users and device types to provide for redundant access and system backup methods.

Turning now descriptively to the drawings, in which similar reference characters denote similar elements throughout the several views, FIG. 1 depicts an architecture diagram of a multimodal EAC system 100. In accordance with certain aspects of the present disclosure, system 100 may comprise an electronic access control (EAC) device 102 configured to selectively secure access to a secured location, access point, container, perimeter and the like. In accordance with certain embodiments, EAC device 102 may comprise one or more of a door lock, panel lock, portable security product (such as puck locks, sliding bolts, padlocks, Mortise, electronic cylinders) and the like. In accordance with certain embodiments, EAC device 102 may comprise an electronic lock cylinder 104 that is operably engaged with a controller 106 and a power source 114. Controller 106 may comprise a processor 108 and a non-transitory computer readable memory device 110 and may be communicably engaged with at least one communications interface 112 via a system bus and may be operably engaged with electronic lock cylinder 104 and power source 114. In accordance with certain aspects of the present disclosure, communications interface 112 may comprise one or more of a wireless communications interface comprising a BLUETOOTH interface, a near-field communications (NFC) interface, a WiFi interface and a wireless electronic key interface. In accordance with certain aspects of the present disclosure, communications interface 112 may be communicably engaged with one or more of electronic key 116, mobile device 118, NFC device 120, and/or a biometric sensor input 122 to receive a data transmission comprising an electronic access request for EAC device 102 from a plurality of users comprising one or more of a first user 124a, a second user 124b, a third user 124c and/or an Nth user 124n. In accordance with certain aspects of the present disclosure, communications interface 112 may be configured to communicate a data packet from the data transmission to controller 106 to process the electronic access request from one or more of the plurality of users. In accordance with certain aspects of the present disclosure, processor 108 is configured to process the electronic access request according to one or more data processing operations as commanded by one or more instructions stored on memory device 110. In accordance with certain aspects of the present disclosure, the one or more instructions stored on memory device 110 may comprise one or more operational settings/configurations configured by at least one administrator user 134, optionally via at least one client device 126 and/or at least one EAC server 128. In accordance with certain aspects of the present disclosure, EAC device 102 may be communicably engaged with client device 126 and/or EAC server 128 via a wired or wireless network interface 132. In accordance with certain embodiments, EAC server 128 may be communicably engaged with at least one database 130. In accordance with certain aspects of the present disclosure, EAC device 102 may be communicably engaged with an alarm system 136 for a secured location in which EAC device 102 is operably installed. In accordance with certain aspects of the present disclosure, EAC device 102 and alarm system 136 may be operably integrated to authorize a user access request, suppress an alarm of alarm system 136 and actuate lock cylinder 104 according to the access modalities/configurations specified by the operational settings stored in memory 110.

In accordance with certain aspects of the present disclosure, system 100 is configured to combine various keyed and keyless technologies into a single locking device (e.g., EAC device 102) so that a user (e.g., administrator user 134) can configure different access modalities for different users and use cases. In accordance with certain aspects of the present disclosure, each access modality system 100 may comprise a plurality of software-defined configurations stored in memory 110 and/or database 130 that defines one or more settings for user identity, temporal parameters, location parameters, situational parameters and specified access modalities for EAC device 102 depending on the use case. For example, system 100 may comprise one or more configurations for an employee user to access EAC device 102 via an electronic key interface; and may comprise a different set of configurations for a third-party vendor user in need of temporary access via a BLE or NFC interface using a smartphone comprising an electronic access control mobile application.

In accordance with certain aspects of the present disclosure, system 100 may be configured according to a first use case comprising one or more software-defined configurations to enable an input from electronic key 116 to command one or more firmware updates, operational configuration and key override capabilities for software or hardware component failures for EAC device 102. In accordance with certain aspects of the present disclosure, system 100 may be configured according to a second use case comprising one or more software-defined configurations for utilizing a BLE transmission from mobile device 118 as a "skeleton key" for various types of locking devices that may or may not have an electronic cylinder, keypad, card swipe, bio sensor, etc. In this case, the BLE transmission is an umbrella skeleton key that can access any and all electronic devices (e.g., EAC device 102) capable of multiple points of access. In accordance with certain aspects of the present disclosure, system 100 may be configured according to a third use case comprising one or more software-defined configurations for one or more security parameters to require a combination of access modalities for critical/sensitive access points; for example, system 100 may require concurrent inputs from electronic key 116, mobile device 118 and NFC device 120 in order to access EAC device 102. In accordance with certain aspects of the present disclosure, system 100 may be configured according to a fourth use case comprising one or more software-defined configurations for one or more emergency access parameters; for example, if there is a large multisite catastrophe, any access modality may be utilized to actuate EAC device 102. In accordance with certain aspects of the present disclosure, system 100 may be configured according to a fifth use case comprising one or more software-defined configurations comprising one or more back-up modalities; for example, if one method of access fails, then EAC device 102 would require one or more alternative modalities in succession until a successive modality is successful or each modality has failed.

Figure 2:
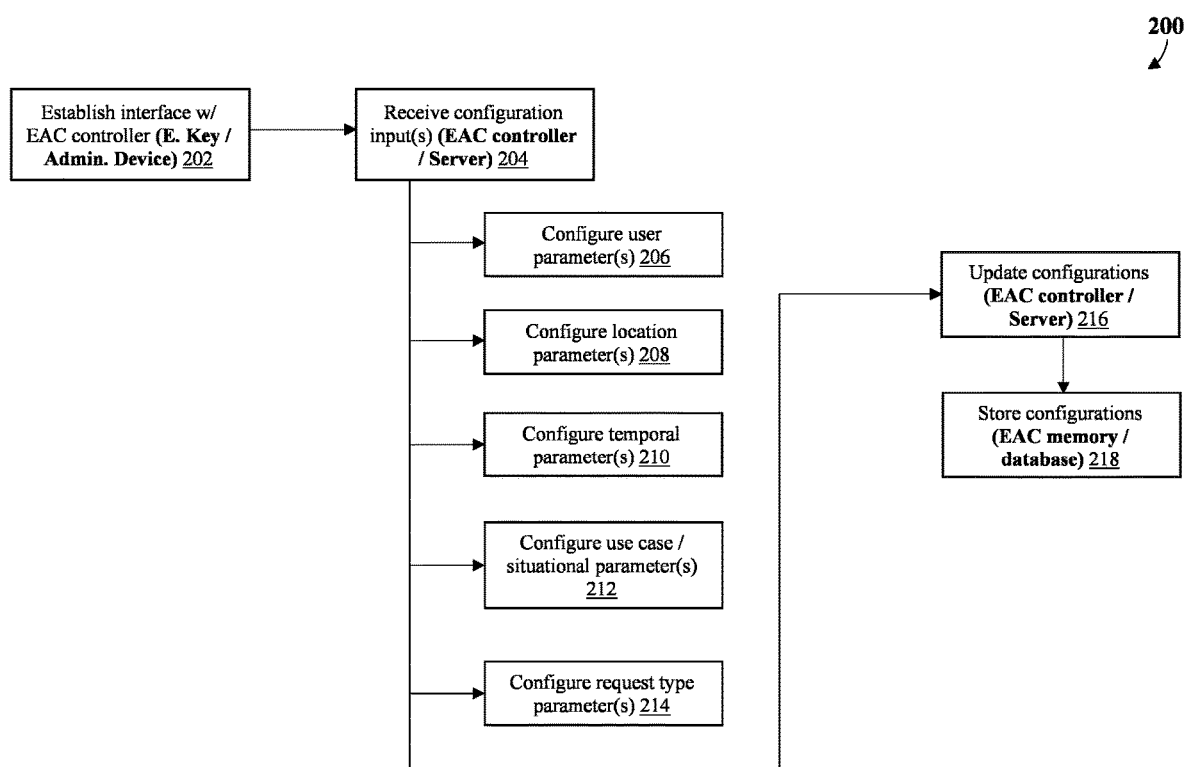
FIG. 2 is a functional block diagram of a multimodal EAC system, in accordance with certain aspects of the present disclosure.

Referring now to FIG. 2, with cross-reference to FIG. 1, a functional block diagram of an operational routine 200 of a multimodal EAC system is shown. In accordance with certain aspects of the present disclosure, routine 200 may be incorporated within multimodal EAC system 100 of FIG. 1. In accordance with certain aspects of the present disclosure, routine 200 may comprise one or more steps or operations for configuring a plurality of software-defined configurations comprising one or more settings for user identity, temporal parameters, location parameters, situational parameters and specified access modalities for operations of the multimodal EAC system. In accordance with certain aspects of the present disclosure, the plurality of software-defined configurations may be configured to command one or more operations of EAC device 102, as shown in FIG. 1. In accordance with certain aspects of the present disclosure, the plurality of software-defined configurations may be stored in memory 110 and/or database 130, as shown in FIG. 1.

In accordance with certain aspects of the present disclosure, routine 200 may comprise one or more steps or operations for establishing a communications interface between one or more devices (e.g., electronic key 116 and/or client device 126, as shown in FIG. 1) and a controller (e.g., controller 106 of FIG. 1) of an EAC device (e.g., EAC device 102 of FIG. 1) (Step 202). Routine 200 may continue by executing one or more steps or operations for receiving one or more configuration inputs from the one or more devices (i.e., modalities) at the controller of the EAC device and/or an EAC server (e.g., EAC server 128 of FIG. 1) (Step 204). In accordance with certain aspects of the present disclosure, routine 200 may execute one or more steps or operations for configuring one or more operational settings for the multimodal EAC system according to the one or more configuration inputs. In certain embodiments, routine 200 may comprise one or more steps or operations for configuring one or more user parameters 206. In accordance with certain aspects of the present disclosure, user parameters 206 may include one or more user roles; for example, employee user, administrator user, vendor user, technician user, tenant user, owner user and the like. In certain embodiments, routine 200 may comprise one or more steps or operations for configuring one or more location parameters 208. In accordance with certain aspects of the present disclosure, location parameters 208 may include the location of one or more access points for one or more EAC devices; for example, perimeter gate, server cabinet, interior door, shroud enclosure and the like. In certain embodiments, routine 200 may comprise one or more steps or operations for configuring one or more temporal parameters 210. In accordance with certain aspects of the present disclosure, temporal parameters 210 may include one or more time-based parameters for accessing one or more EAC devices; for example, days and times for standard access and days and times for special access. In certain embodiments, routine 200 may comprise one or more steps or operations for configuring one or more use case or situational parameters 212. In accordance with certain aspects of the present disclosure, use case or situational parameters 212 may include one or more parameters for configuring a use case for one or more EAC devices (for example, configuring the settings on the EAC device, requesting access from the EAC device, etc.). In accordance with certain aspects of the present disclosure, use case or situational parameters 212 may include one or more parameters for configuring situational parameters; for example, parameters for standard controls, special controls, enhanced security controls, emergency controls, etc. In certain embodiments, routine 200 may comprise one or more steps or operations for configuring one or more request type parameters 214. In accordance with certain aspects of the present disclosure, request type parameters 214 may include one or more request type modalities; for example, electronic key, BLUETOOTH, NFC, biometric sensor, keypad entry and the like. In accordance with certain aspects of the present disclosure, routine 200 may be configured to execute one or more steps or operations for updating the one or more operational settings for the multimodal EAC system according to the one or more configuration inputs at the EAC controller and/or the EAC server (Step 216). In accordance with certain aspects of the present disclosure, routine 200 may be configured to execute one or more steps or operations for storing the one or more operational settings for the multimodal EAC system according to the one or more configuration inputs at a memory device of the EAC controller (e.g., memory 110 of FIG. 1) and/or a database of the EAC server (e.g., database 130 of FIG. 1) (Step 218).

Figure 3:
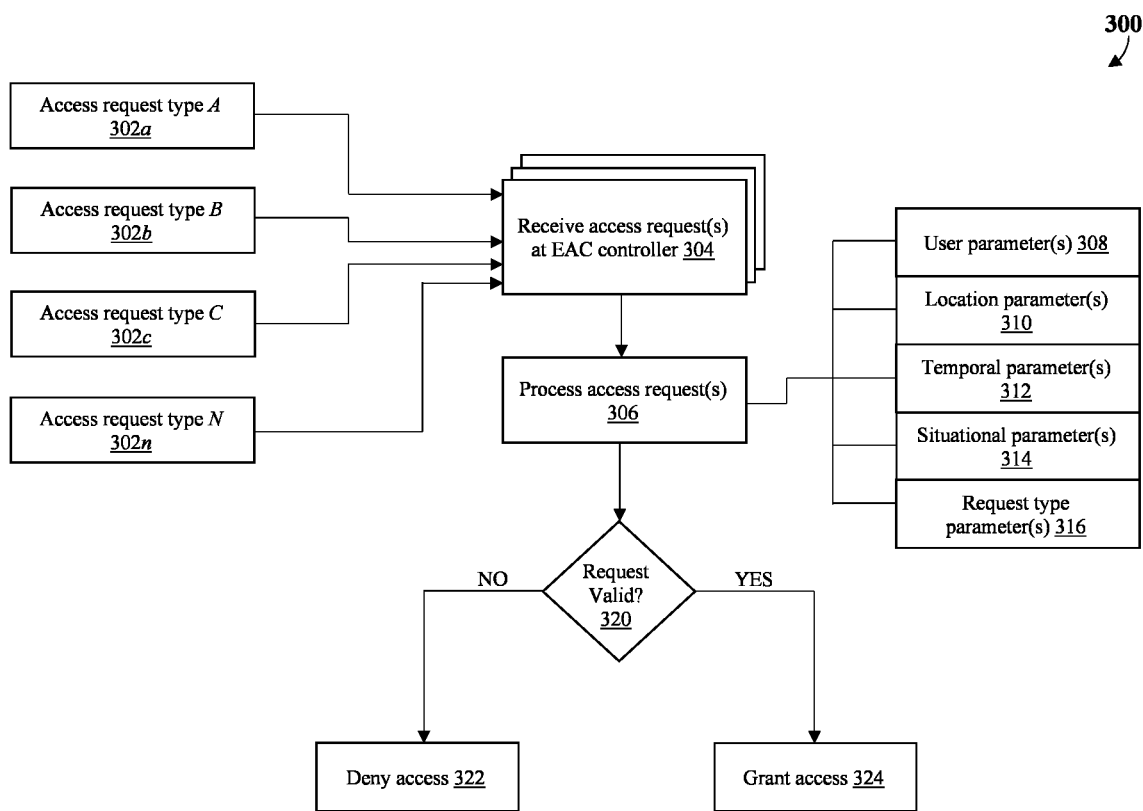
FIG. 3 is a functional block diagram of a multimodal EAC system, in accordance with certain aspects of the present disclosure.

Referring now to FIG. 3, a functional block diagram of an operational routine 300 of a multimodal EAC system is shown. In accordance with certain aspects of the present disclosure, the multimodal EAC system may comprise system 100 of FIG. 1. In accordance with certain aspects of the present disclosure, routine 300 may comprise one or more steps or operations for processing a plurality of access requests at a controller of an EAC device. In accordance with certain aspects of the present disclosure, the controller may comprise controller 106 of FIG. 1 and the EAC device may comprise EAC device 102 of FIG. 1.

In accordance with certain aspects of the present disclosure, routine 300 may be initiated upon receiving one or more access requests from one or more user devices (i.e., modalities) at the controller of the EAC device (Step 304). The one or more access requests may comprise one or more access request types from one or more devices; for example, an access request type A 302*a*, an access request type B 302*b*, an access request type C 302*c* and/or an access request type N 302*n*. In accordance with certain aspects of the present disclosure, access request type A 302*a*, access request type B 302*b*, access request type C 302*c* and access request type N 302*n* may comprise different types of access request modalities corresponding to different access request device types. For example, access request type A 302*a* may comprise an access request from an electronic key (e.g., electronic key 116 of FIG. 1), access request type B 302*b* may comprise an access request from a mobile electronic device such as a smartphone (e.g., mobile device 118 of FIG. 1), access request type C 302*c* may comprise an access request from an NFC device such as a key fob (e.g., NFC device 120 of FIG. 1), and access request type N 302*n* may comprise an access request from a biometric sensor or keypad input (e.g., biometric sensor 122 of FIG. 1). In accordance with certain aspects of the present disclosure, routine 300 may proceed by executing one or more steps or operations for processing the access requests at the controller of the EAC device according to the settings/configurations stored in memory (e.g., memory 110 of FIG. 1) of the EAC device. In accordance with certain aspects of the present disclosure, the settings/configurations stored in memory of the EAC device may comprise the settings/configurations that were configured as an output of routine 200, as shown and described in FIG. 2. In accordance with certain aspects of the present disclosure, the settings/configurations may comprise a plurality of parameters for processing each of access request type A 302*a*, access request type B 302*b*, access request type C 302*c* and access request type N 302*n*. For example, the plurality of parameters may comprise one or more user parameters 308, location parameters 310, temporal parameters 312, situational parameters 314 and/or request type parameters 316. In accordance with certain aspects of the present disclosure, user parameters 308 may include parameters for processing one or more data types corresponding to one or more user roles; for example, employee user, administrator user, vendor user, technician user, tenant user, owner user and the like. Location parameters 310 may include parameters for processing one or more data types corresponding to a location of one or more access points for one or more EAC devices; for example, perimeter gate ID, server cabinet ID, interior door ID, shroud enclosure ID and the like. In accordance with certain aspects of the present disclosure, temporal parameters 312 may include parameters for processing one or more data types corresponding to one or more time-based parameters for accessing the EAC device; for example, time stamps or other data corresponding to days and times for standard access and days and times for special access. In accordance with certain aspects of the present disclosure, use case or situational parameters 314 may include parameters for processing one or more data types corresponding to use case or situational identifiers for accessing the EAC device; for example, parameters for standard controls, special controls, enhanced security controls, emergency controls, etc. In accordance with certain aspects of the present disclosure, request type parameters 316 may include parameters for processing one or more data types corresponding to one or more request type modalities; for example, electronic key signal, BLUETOOTH, NFC, biometric sensor, keypad entry and the like. In accordance with certain aspects of the present disclosure, an output of Step 306 is to determine whether an access request received at the EAC controller is valid or invalid (Step 320). If YES (i.e., the request is valid), then routine 300 executes one or more steps or operations to grant access to the EAC device (Step 324); for example, actuating lock cylinder 104 of FIG. 1). If NO (i.e., the request is invalid), then routine 300 executes one or more steps or operations to deny access to the EAC device (Step 322).

In an illustrative example of how routine 300 may be implemented by a user of the multimodal EAC system of the present disclosure, a first user comprising a first user type (e.g., an employee user) approaches a secured location comprising an access point secured by an EAC device. The multimodal EAC system may be configured wherein the EAC device is configured to associate a first type of access modality with the first user (e.g., employee users are required to use key fobs to request access to the specified access point of the secured location). The user may make an access request to the EAC device; for example, placing a key fob in a communication range of the EAC device. The EAC device may receive a signal transmission from the key fob and process the data from the signal transmission to determine whether an authorized user has presented an authorize access modality at an authorized location during an authorized time and/or for an authorized reason/situation. If the controller of the EAC device determines that each of these parameters are satisfied by the access request, then the EAC device may grant access to the user. If the controller of the EAC determines that one or more of these parameters are not satisfied, then the EAC device may grant access to the user and/or provide a communication to the user to provide an alternative access request via an alternative access modality to the EAC device (as described in more detail in FIG. 4, below).

Figure 4:
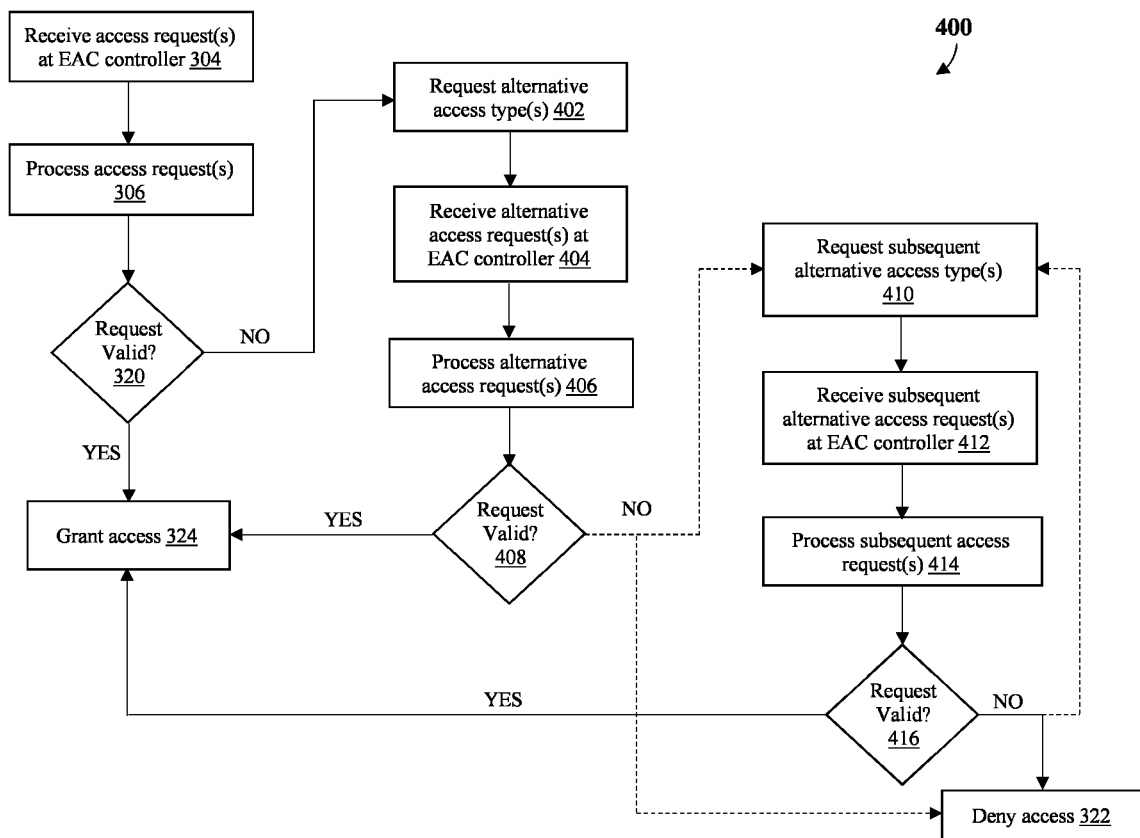
FIG. 4 is a functional block diagram of an operational routine of a multimodal EAC system, in accordance with certain aspects of the present disclosure.

Referring now to FIG. 4, a functional block diagram of an operational routine 400 of a multimodal EAC system is shown. In accordance with certain aspects of the present disclosure, the multimodal EAC system may comprise system 100 of FIG. 1. In accordance with certain aspects of the present disclosure, routine 400 may comprise one or more steps or operations for processing a plurality of access requests from one or more user devices (i.e., modalities) at a controller of an EAC device. In accordance with certain aspects of the present disclosure, the controller may comprise controller 106 of FIG. 1 and the EAC device may comprise EAC device 102 of FIG. 1. In accordance with certain aspects of the present disclosure, routine 400 may be successive or sequential to routine 300 of FIG. 3 and/or may comprise a subroutine of routine 300 of FIG. 3. In accordance with certain aspects of the present disclosure, routine 400 may be initiated upon Step 320 of FIG. 3, in which an access request is determined invalid. In accordance with certain aspects of the present disclosure, an access request may be determined as invalid in response to failing to satisfy one or more data processing parameters for the EAC device (e.g., determining whether an authorized user has presented an authorize access modality at an authorized location during an authorized time and/or for an authorized reason/situation). If the output of Step 320 determines that the access request is invalid, routine 400 may proceed by executing one or more steps or operations for requesting an alternative access type (i.e., alternative access modality) from a user (Step 402). For example, if an employee user has communicated an access request via a BLUETOOTH interface of a mobile device, but the configurations for the EAC device require employee users to request access via a key fob (i.e., NFC device), then the EAC device may provide an output or communication requesting an alternative access modality from the employee user. Routine 400 may proceed by executing one or more steps or operations for receiving the alternative access request at the EAC controller (Step 404). Routine 400 may proceed by executing one or more steps or operations for processing the alternative access request at the EAC controller (Step 406). If the request is valid, then routine 400 may proceed (Step 408) by granting access with the EAC device as provided by Step 324 of routine 300. If the request is still invalid, then routine 400 may proceed (Step 408) by requesting one or more subsequent alternative access request types (Step 410). The one or more subsequent alternative access request types may be received (Step 412) and processed (Step 414) at the EAC controller to determine if the one or more subsequent alternative access request types are valid (Step 416). If YES (i.e., the request is valid), then routine 400 may proceed (Step 408) by granting access with the EAC device as provided by Step 324 of routine 300. If NO (i.e., the request is invalid), then routine 400 may proceed (Step 408) by denying access with the EAC device as provided by Step 322 of routine 300.

Figure 5:
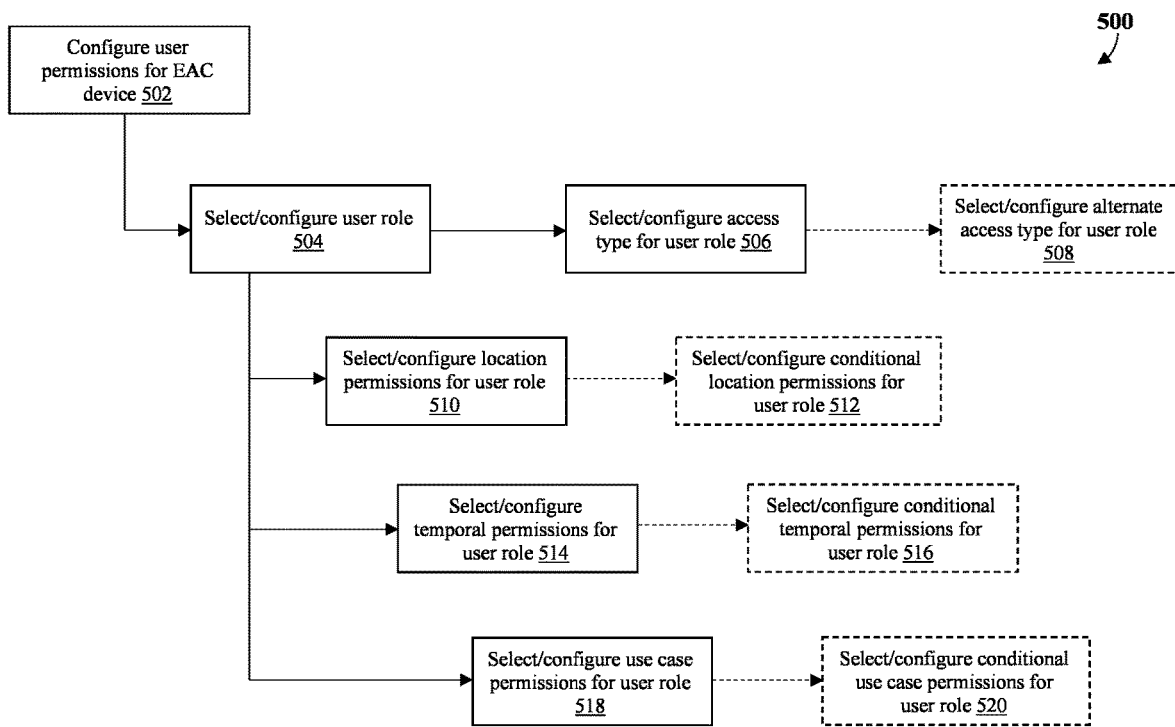
FIG. 5 is a functional block diagram of an operational routine of a multimodal EAC system, in accordance with certain aspects of the present disclosure.

Referring now to FIG. 5, a functional block diagram of an operational routine 500 of a multimodal EAC system is shown. In accordance with certain aspects of the present disclosure, routine 500 may comprise one or more steps or operations for configuring a plurality of software-defined configurations comprising one or more user permissions/user settings within a multimodal EAC system. In accordance with certain aspects of the present disclosure, the multimodal EAC system may comprise system 100 of FIG. 1. In accordance with certain aspects of the present disclosure, routine 500 may be successive or sequential to routine 300 of FIG. 3 and/or routine 400 of FIG. 4 and/or may comprise a subroutine of routine 300 of FIG. 3 and/or routine 400 of FIG. 4.

In accordance with certain aspects of the present disclosure, one or more steps of routine 500 may be executed within a graphical user interface of an electronic access control application executing on an administrator user device. Routine 500 may be initiated upon executing one or more steps or operations for configuring (e.g., in response to an input by the administrator user) one or more user permissions/roles for accessing one or more EAC devices within the multimodal EAC system (Step 502). Step 502 may include one or more substeps 504-520 for configuring one or more settings for each authorized user across the multimodal EAC system. In accordance with certain embodiments, routine 500 may comprise one or more steps or operations for selecting or configuring (e.g., in response to an input by the administrator user) one or more user roles for one or more authorized users (Step 502). Once a user role has been selected (Step 504), routine 500 may continue by executing one or more steps or operations (e.g., in response to an input by the administrator user) for selecting or configuring an access type for each user role (e.g., key fob, BLUETOOTH via mobile device, electronic key, keypad, biometric input, etc.) (Step 506). In certain embodiments, routine 500 may comprise one or more steps or operations (e.g., in response to an input by the administrator user) for selecting or configuring a primary access type and a secondary or alternative access type for each user role (Step 508). In accordance with certain aspects of the present disclosure, routine 500 may comprise one or more steps or operations for selecting or configuring (e.g., in response to an input by the administrator user) one or more location permission for each user role (i.e., specified locations within the multimodal electronic access control system for which each user role is permitted access) (Step 510). In certain embodiments, routine 500 may comprise one or more steps or operations (e.g., in response to an input by the administrator user) for selecting or configuring conditional location permissions for the user role (Step 512); for example, emergency access permissions. In accordance with certain aspects of the present disclosure, routine 500 may comprise one or more steps or operations for selecting or configuring (e.g., in response to an input by the administrator user) one or more temporal permission for each user role (i.e., specified times during which each user role is permitted access to EAC devices within the multimodal EAC system) (Step 514). In certain embodiments, routine 500 may comprise one or more steps or operations (e.g., in response to an input by the administrator user) for selecting or configuring conditional temporal permissions for the user role (Step 516); for example, emergency access permissions, special service access and the like. In accordance with certain aspects of the present disclosure, routine 500 may comprise one or more steps or operations for selecting or configuring (e.g., in response to an input by the administrator user) one or more use case permissions for each user role (i.e., system service, normal working period, override permission, administrator controls and the like) (Step 518). In certain embodiments, routine 500 may comprise one or more steps or operations (e.g., in response to an input by the administrator user) for selecting or configuring conditional use case permissions for the user role (Step 520); for example, emergency permissions, special access permissions and the like.

Figure 6:
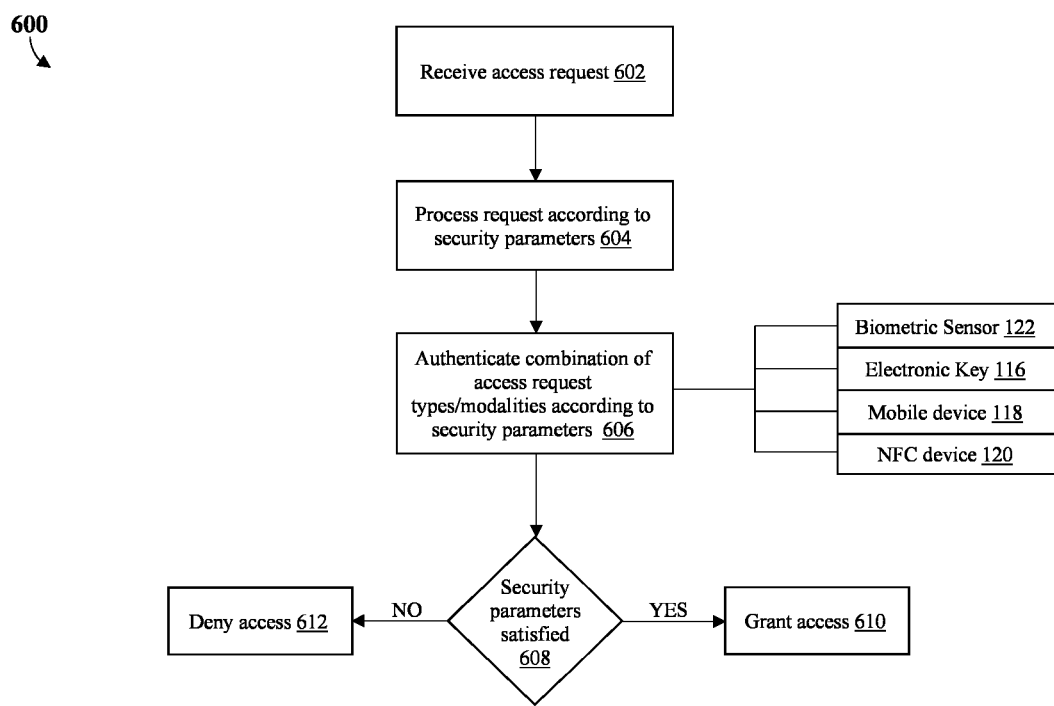
FIG. 6 is a functional block diagram of an operational routine of a multimodal EAC system, in accordance with certain aspects of the present disclosure.

Referring now to FIG. 6, a functional block diagram of an operational routine 600 of a multimodal electronic locking system is shown. In accordance with certain aspects of the present disclosure, the multimodal EAC system may comprise system 100 of FIG. 1. In accordance with certain aspects of the present disclosure, routine 600 may comprise one or more steps or operations for processing one or more electronic access request according to one or more security parameters of the multimodal electronic locking system. In accordance with certain aspects of the present disclosure, the multimodal EAC system may comprise system 100 of FIG. 1. In accordance with certain aspects of the present disclosure, routine 600 may be successive or sequential to routine 300 of FIG. 3 and/or routine 400 of FIG. 4 and/or routine 500 of FIG. 5 and/or may comprise a subroutine of routine 300 of FIG. 3 and/or routine 400 of FIG. 4 and/or routine 500 of FIG. 5.

In accordance with certain aspects of the present disclosure, routine 600 may commence by executing one or more steps or operations for receiving an access request from one or more user devices (i.e., modalities) at a controller of an EAC device of the multimodal EAC system (Step 602). Routine 600 may continue by executing one or more steps or operations for processing the access request according to one or more security parameters (e.g., based on the configurations of multimodal EAC system) (Step 604). Routine 600 may continue by executing one or more steps or operations for authenticating a combination of access request types/modalities for the access request according to the one or more security parameters (Step 606). In accordance with certain aspects of the present disclosure, the one or more security parameters may comprise a required combination of specified access request types/modalities to be concurrently or successively presented to the controller of the EAC device in order to be successfully granted access by the EAC device. For example, the one or more security parameters may require a combination of inputs from one or more of biometric sensor 122, electronic key 116, mobile device 118 and/or NFC device 120 to be concurrently or successively presented to the controller of the EAC device. In accordance with certain aspects of the present disclosure, routine 600 may perform one or more steps or operations for determining whether the security parameters have been satisfied (Step 608). If YES, routine 600 may proceed by executing one or more steps or operations for granting access at the EAC device (Step 610). If NO, routine 600 may deny the access request (Step 612).

Figure 7:
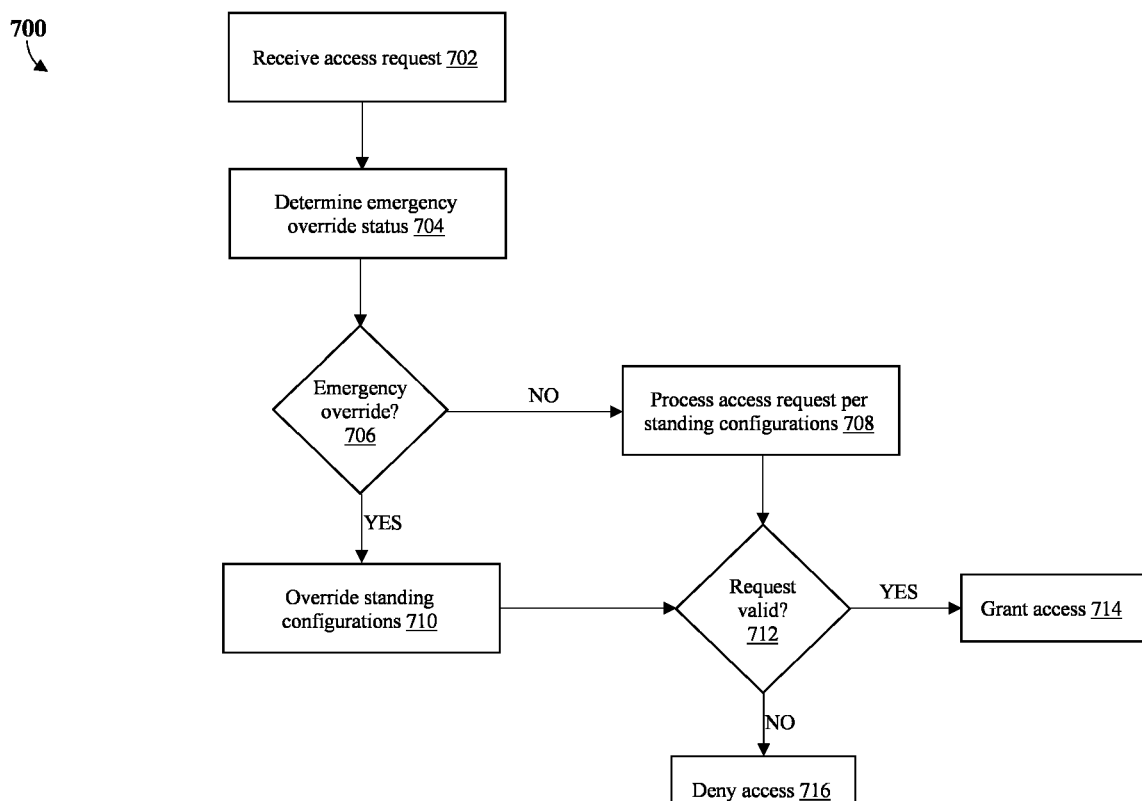
FIG. 7 is a functional block diagram of an operational routine of a multimodal EAC system, in accordance with certain aspects of the present disclosure.

Referring now to FIG. 7, a functional block diagram of an operational routine 700 of a multimodal EAC system is shown. In accordance with certain aspects of the present disclosure, the multimodal EAC system may comprise system 100 of FIG. 1. In accordance with certain aspects of the present disclosure, routine 700 may comprise one or more steps or operations for determining an emergency override mode of the multimodal EAC system. In accordance with certain aspects of the present disclosure, the multimodal EAC system may comprise system 100 of FIG. 1. In accordance with certain aspects of the present disclosure, routine 700 may be successive or sequential to routine 300 of FIG. 3 and/or routine 400 of FIG. 4 and/or routine 500 of FIG. 5 and/or routine 600 of FIG. 6 and/or may comprise a subroutine of routine 300 of FIG. 3 and/or routine 400 of FIG. 4 and/or routine 500 of FIG. 5 and/or routine 600 of FIG. 6.

In accordance with certain aspects of the present disclosure, routine 700 may be initiated by executing one or more steps or operations for receiving an access request from one or more user devices (i.e., modalities) at a controller of an EAC device (Step 702). Routine 700 may proceed by executing one or more steps or operations for determining an emergency override status for the multimodal EAC system (Step 704). Routine 700 may proceed by executing one or more steps or operations for processing an emergency override (Step 706). If NO (i.e., an emergency override is not present), routine 700 may execute one or more steps or operations for processing the access request according to the standing configurations of the multimodal EAC system Step 708). If YES (i.e., an emergency override is present), routine 700 may execute one or more steps or operations for overriding the standing configurations of the multimodal EAC system and applying the emergency override configurations (Step 710). In accordance with certain aspects of the present disclosure, routine 700 may proceed by executing one or more steps or operations for determining whether the access request is valid according to the relevant system configurations (Step 712). If YES (i.e., the request is valid), then routine 700 may proceed by granting access with the EAC device (Step 714). If NO (i.e., the request is invalid), then routine 700 may proceed by denying access with the EAC device (Step 716).

Figure 8:
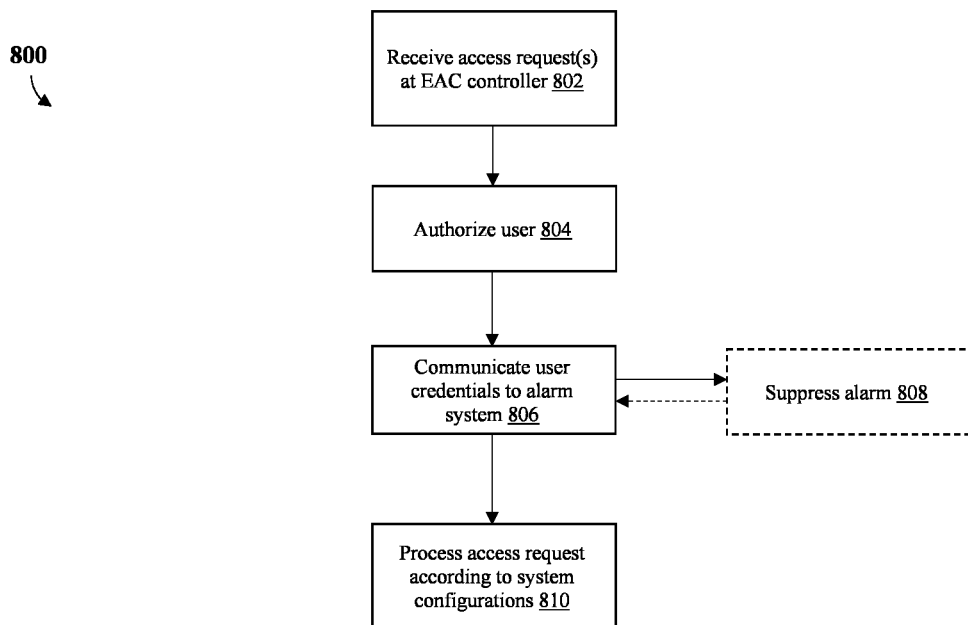
FIG. 8 is a functional block diagram of an operational routine of a multimodal EAC system, in accordance with certain aspects of the present disclosure.

Referring now to FIG. 8, a functional block diagram of an operational routine 800 of a multimodal EAC system is shown. In accordance with certain aspects of the present disclosure, the multimodal EAC system may comprise system 100 of FIG. 1. In accordance with certain aspects of the present disclosure, routine 800 may comprise one or more steps or operations for integration of the multimodal EAC system with a building alarm system. In accordance with certain aspects of the present disclosure, the multimodal EAC system may comprise system 100 of FIG. 1. In accordance with certain aspects of the present disclosure, routine 800 may be successive or sequential to routine 300 of FIG. 3 and/or routine 400 of FIG. 4 and/or routine 500 of FIG. 5 and/or routine 600 of FIG. 6 and/or routine 700 of FIG. 7 and/or may comprise a subroutine of routine 300 of FIG. 3 and/or routine 400 of FIG. 4 and/or routine 500 of FIG. 5 and/or routine 600 of FIG. 6 and/or routine 700 of FIG. 7.

In accordance with certain aspects of the present disclosure, routine 800 may be initiated by executing one or more steps or operations for receiving an access request from one or more user devices (i.e., modalities) at a controller of an EAC device (Step 802). Routine 800 may continue by executing one or more steps or operations for authorizing a user of the multimodal EAC system (Step 804). Routine 800 may continue by executing one or more steps or operations for communicating one or more user credentials to at least one building alarm system communicably engaged with the multimodal EAC system via at least one data transfer interface (Step 806). In accordance with certain embodiments, the at least one building alarm system may execute one or more steps or operations for suppressing an alarm of the building alarm system (Step 808). In accordance with certain aspects of the present disclosure, the building alarm system may be configured to provide a confirmation to the multimodal EAC system that the alarm has been suppressed. Routine 800 may proceed by executing one or more steps or operations for processing the access request from the one or more user devices (i.e., modalities) at the controller of an EAC device according to the configurations of the multimodal EAC system (Step 810).

Figure 9:
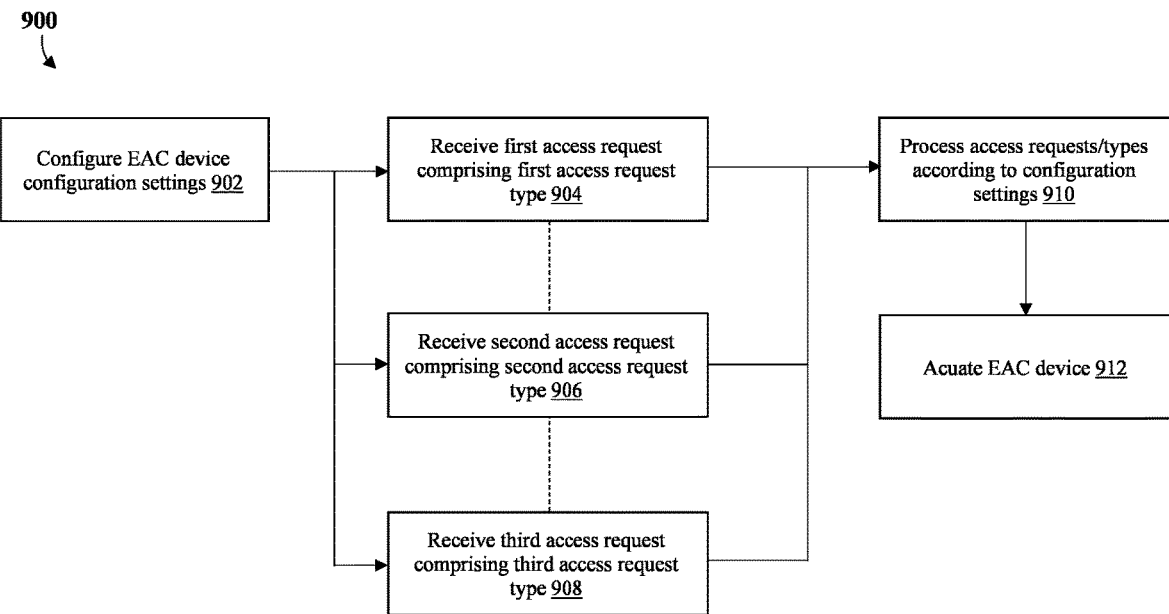
FIG. 9 is a process flow diagram of a multimodal electronic access control method, in accordance with certain aspects of the present disclosure.

Referring now to FIG. 9, a process flow diagram of a multimodal electronic access control method 900 is shown. In accordance with certain aspects of the present disclosure, method 900 may commence by performing one or more steps or operations for configuring, with an input device communicably engaged with a controller of an electronic access control device, one or more configuration settings comprising configurations for one or more user roles, one or more access request types and one or more access event types associated with the electronic access control device (Step 902). Method 900 may continue by performing one or more steps or operations for receiving, with the controller of the electronic access control device via at least one wireless communications interface, a first access request from a mobile electronic device, wherein the first access request comprises a first access request type (Step 904). Method 900 may continue by performing one or more steps or operations for receiving, with the controller of the electronic access control device via at least one near field communications interface, a second access request from a near field communication-enabled device, wherein the second access request comprises a second access request type (Step 906). Method 900 may continue by performing one or more steps or operations for receiving, with the controller of the electronic access control device via an electronic key interface, a third access request from an electronic key, wherein the third access request comprises a third access request type (Step 908). In accordance with certain aspects of the present disclosure, Steps 904-908 may be performed successively, concurrently or at different/distinct time points. Method 900 may continue by performing one or more steps or operations for processing, with the controller of the electronic access control device, one or more of the first access request, the second access request and the third access request to authenticate an authorized electronic access code, an authorized user role and an authorized access request type for the electronic access control device according to the one or more configuration settings (Step 910). Method 900 may continue by performing one or more steps or operations for actuating, with the controller of the electronic access control device, the electronic access control device from a locked state to an unlocked state in response to successfully authenticating the authorized electronic access code, the authorized user role and the authorized access request type according to the one or more configuration settings (Step 912).

In accordance with certain aspects of the present disclosure, method 900 may comprise one or more steps or operations for updating a firmware of the controller of the electronic access control device in response to receiving, with the controller of the electronic access control device, at least one input from the electronic key. In accordance with certain aspects of the present disclosure, the one or more configuration settings may comprise configurations for linking one or more user roles with one or more access request types. In accordance with certain aspects of the present disclosure, the one or more configuration settings may comprise configurations for linking one or more access event types with the one or more user roles and the one or more access request types. In accordance with certain aspects of the present disclosure, method 900 may comprise one or more steps or operations for receiving, with the controller of the electronic access control device, an alternative access request comprising an alternative access request type in response to unsuccessfully authenticating one or more of the authorized electronic access code, the authorized user role and the authorized access request type. In accordance with certain aspects of the present disclosure, method 900 may comprise one or more steps or operations for receiving, with the controller of the electronic access control device, a biometric input from a biometric sensor, wherein the biometric input comprises a fourth access request type.

Figure 10:
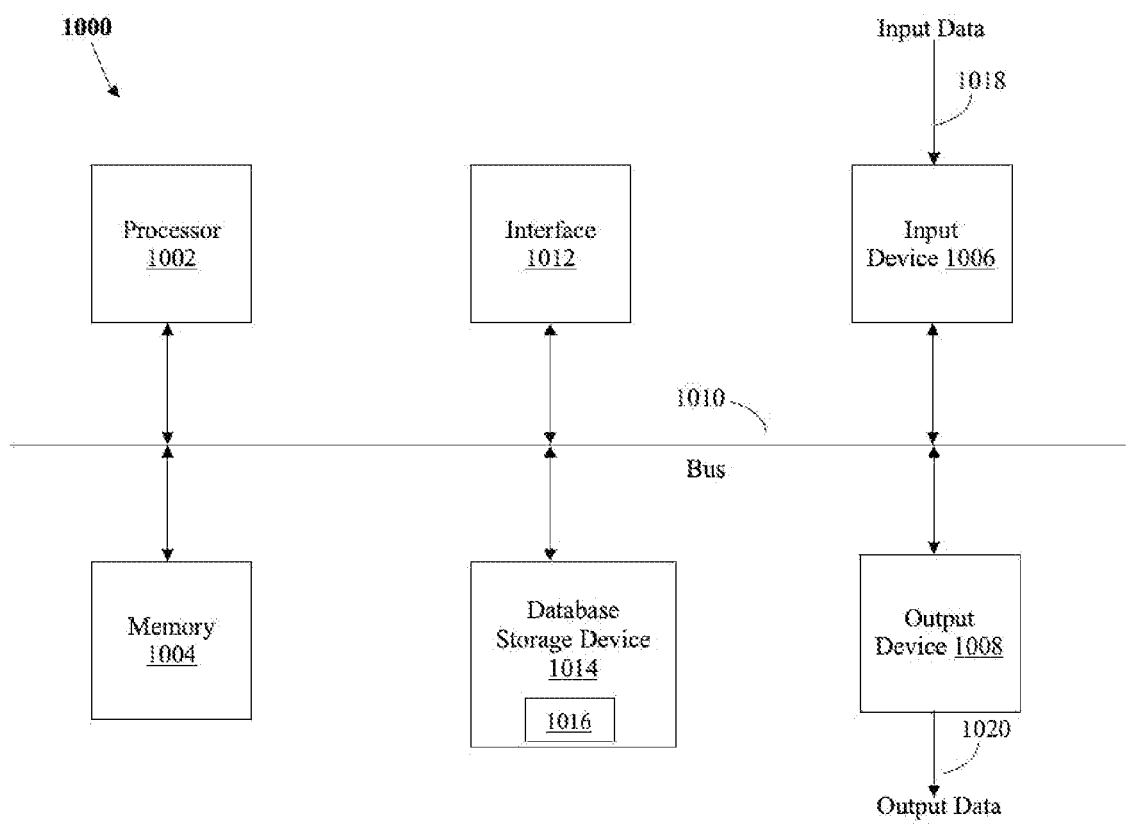
FIG. 10 is an architecture diagram of an exemplary processor-implemented computing system in which one or more aspects of the present disclosure may be implemented.

Referring now to FIG. 10, a processor-implemented computing device in which one or more aspects of the present disclosure may be implemented is shown. According to an embodiment, a processing system 1000 may generally comprise at least one processor 1002, a memory 1004, an input device 1006 for receiving input data 1018 and an output device 1008 that produces output data 1020 coupled together with at least one bus 1010. In certain embodiments, input device 1006 and output device 1008 could be the same device. An interface 1012 can also be provided for coupling the processing system 1000 to one or more peripheral devices, for example interface 1012 could be a PCI card or PC card. At least one database storage device 1014 which houses at least one database 1016 can also be provided. The memory 1004 can be any form of memory device, for example, volatile or non-volatile memory, solid state storage devices, magnetic devices, etc. The processor 1002 could comprise more than one distinct processing device, for example to handle different functions within the processing system 1000. Input device 1006 receives input data 1018 and can comprise, for example, a keyboard, a pointer device such as a pen-like device or a mouse, audio receiving device for voice-controlled activation such as a microphone, data receiver or antenna such as a modem or wireless data adaptor, data acquisition card, etc. Input data 1018 could come from different sources, for example keyboard instructions in conjunction with data received via a network. Output device 1008 produces or generates output data 1020 and can comprise, for example, a display device or monitor in which case output data 1020 is visual, a printer in which case output data 1020 is printed, a port for example a USB port, a peripheral component adaptor, a data transmitter or antenna such as a modem or wireless network adaptor, etc. Output data 1020 could be distinct and derived from different output devices, for example a visual display on a monitor in conjunction with data transmitted to a network. A user could view data output, or an interpretation of the data output, on, for example, a monitor or using a printer. The storage device 1014 can be any form of data or information storage means, for example, volatile or non-volatile memory, solid state storage devices, magnetic devices, etc.

In use, the processing system 1000 is adapted to allow data or information to be stored in and/or retrieved from, via wired or wireless communication means, at least one database 1016. The interface 1012 may allow wired and/or wireless communication between the processing unit 1002 and peripheral components that may serve a specialized purpose. In general, the processor 1002 can receive instructions as input data 1018 via input device 1006 and can display processed results or other output to a user by utilizing output device 1008. More than one input device 1006 and/or output device 1008 can be provided. It should be appreciated that the processing system 1000 may be any form of terminal, server, specialized hardware, or the like.

It is to be appreciated that the processing system 1000 may be a part of a networked communications system. Processing system 1000 could connect to a network, for example the Internet or a WAN. Input data 1018 and output data 1020 could be communicated to other devices via the network. The transfer of information and/or data over the network can be achieved using wired communications means or wireless communications means. A server can facilitate the transfer of data between the network and one or more databases. A server and one or more databases provide an example of an information source. For example, processing system 1000 may establish a data transfer interface with a remote server, for example over a public Internet, and send and receive data to and from the server in accordance with one or more data transfer protocols, including Hypertext Transfer Protocol (HTTP)/Hypertext Transfer Protocol Secure (HTTPS).

Thus, the processing system 1000 illustrated in FIG. 10 may operate in a networked environment using logical connections to one or more remote computers. The remote computer may be a personal computer, a server, a router, a network PC, a peer device, or other common network node, and typically includes many or all of the elements described above.

It is to be further appreciated that the logical connections depicted in FIG. 10 include a local area network (LAN) and a wide area network (WAN) but may also include other networks such as a personal area network (PAN). Such networking environments are commonplace in offices, enterprise-wide computer networks, intranets, and the Internet. For instance, when used in a LAN networking environment, the processing system 1000 is connected to the LAN through a network interface or adapter. When used in a WAN networking environment, the computing system environment typically includes a modem or other means for establishing communications over the WAN, such as the Internet. The modem, which may be internal or external, may be connected to a system bus via a user input interface, or via another appropriate mechanism. In a networked environment, program modules depicted relative to the computing system environment 1000, or portions thereof, may be stored in a remote memory storage device. It is to be appreciated that the illustrated network connections of FIG. 10 are exemplary and other means of establishing a communications link between multiple computers may be used.

FIG. 10 is intended to provide a brief, general description of an illustrative and/or suitable exemplary environment in which various embodiments of the invention may be implemented. FIG. 10 is an example of a suitable environment and is not intended to suggest any limitation as to the structure, scope of use, or functionality of an embodiment of the present invention. A particular environment should not be interpreted as having any dependency or requirement relating to any one or combination of components illustrated in an exemplary operating environment. For example, in certain instances, one or more elements of an environment may be deemed not necessary and omitted. In other instances, one or more other elements may be deemed necessary and added.

In the description that follows, certain embodiments may be described with reference to acts and symbolic representations of operations that are performed by one or more computing devices, such as the processing system 1000 of FIG. 10. As such, it will be understood that such acts and operations, which are at times referred to as being computer-executed, include the manipulation by the processor of the computer of electrical signals representing data in a structured form. This manipulation transforms the data or maintains them at locations in the memory system of the computer, which reconfigures or otherwise alters the operation of the computer in a manner understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments of the present invention can be implemented with numerous other general-purpose or special-purpose computing devices, systems or configurations. Examples of well-known computing systems, environments, and configurations suitable for use in embodiment of the invention include personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Various embodiments of the invention will be described herein in a general context of computer-executable instructions, such as program modules, being executed by a computer. Generally, program modules include routines, programs, objects, components, data structures, etc., that perform particular tasks or implement particular abstract data types. In certain embodiments, distributed computing environments where tasks are performed by remote processing devices that are linked through a communications network may also be employed. In distributed computing environments, program modules may be located in both local and remote computer storage media including memory storage devices.

With the general computing system environment 1000 of FIG. 10 being shown and discussed above, the following description and remaining figures pertain to various exemplified embodiments of the present invention generally relating to systems and methods configuring, with an input device communicably engaged with a controller of an electronic access control device, one or more configuration settings comprising configurations for one or more user roles, one or more access request types and one or more access event types associated with the electronic access control device; receiving, with the controller of the electronic access control device via at least one wireless communications interface, a first access request from a mobile electronic device, wherein the first access request comprises a first access request type; receiving, with the controller of the electronic access control device via at least one near field communications interface, a second access request from a near field communication-enabled device, wherein the second access request comprises a second access request type; receiving, with the controller of the electronic access control device via an electronic key interface, a third access request from an electronic key, wherein the third access request comprises a third access request type; processing, with the controller of the electronic access control device, one or more of the first access request, the second access request and the third access request to authenticate an authorized electronic access code, an authorized user role and an authorized access request type for the electronic access control device according to the one or more configuration settings; and actuating, with the controller of the electronic access control device, the electronic access control device from a locked state to an unlocked state in response to successfully authenticating the authorized electronic access code, the authorized user role and the authorized access request type according to the one or more configuration settings.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random-access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general-purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions (i.e., computer-executable instructions) may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s). Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

The computer-executable program code may also be loaded onto a computer or other programmable data processing apparatus to cause a series of operational phases to be performed on the computer or other programmable apparatus to produce a computer-implemented process such that the code portions which execute on the computer or other programmable apparatus provide phases for implementing the functions/acts specified in the flowchart and/or block diagram block(s). Alternatively, computer program implemented phases or acts may be combined with operator or human implemented phases or acts in order to carry out an embodiment of the invention.

As the phrases are used herein, a processor may be "operable to" or "configured to" perform a certain function in a variety of ways, including, for example, by having one or more general-purpose circuits perform the function by executing particular computer-executable program code embodied in computer-readable medium, and/or by having one or more application-specific circuits perform the function.

The terms "program" or "software" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor but may be distributed in a modular fashion amongst a number of different computers or processors to implement various aspects of the present technology.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." As used herein, the terms "right," "left," "top," "bottom,"

"upper," "lower," "inner" and "outer" designate directions in the drawings to which reference is made.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention.

What is claimed is:

1. An electronic access control apparatus, comprising:
    an electronic lock comprising a locking mechanism configured to be selectively engaged between a locked state and an unlocked state;
    a controller operably engaged with the electronic lock to command the locking mechanism between the locked state and the unlocked state, wherein the controller is configured to perform one or more operations comprising:
    receiving a first access request via a first interface, wherein the first access request comprises a first access request type;
    receiving a second access request via a second interface, wherein the second access request comprises a second access request type;
    receiving a third access request via a third interface, wherein the third access request comprises a third access request type;
    processing one or more of the first access request, the second access request and the third access request to authenticate an authorized electronic access code, an authorized user role and an authorized access request type according to one or more configuration settings;
    actuating the electronic lock to the unlocked state in response to successfully authenticating the authorized electronic access code, the authorized user role and the authorized access request type according to the one or more configuration settings; and
    receiving an alternative access request comprising an alternative access request type in response to unsuccessfully authenticating the authorized electronic access code, the authorized user role and the authorized access request type.

2. The apparatus of claim 1 wherein the one or more configuration settings comprise configurations for linking one or more user roles with one or more access request types.

3. The apparatus of claim 2 wherein the one or more configuration settings comprise configurations for linking one or more access event types with the one or more user roles and the one or more access request types.

4. The apparatus of claim 1 wherein the one or more operations further comprise simultaneously receiving two or more of the first access request, the second access request and the third access request.

5. The apparatus of claim 4 wherein the one or more operations further comprise processing the two or more of the first access request, the second access request and the third access request to authenticate the authorized electronic access code, the authorized user role and the authorized access request type according to the one or more configuration settings.

6. The apparatus of claim 1 wherein the one or more operations further comprise receiving a sensor input from at least one sensor device, wherein the sensor input comprises a fourth access request type.

7. An electronic access control system, comprising:
an electronic lock comprising a locking mechanism configured to be actuated between a locked state and an unlocked state;
a controller operably engaged with the electronic lock to actuate the locking mechanism between the locked state and the unlocked state,
wherein the controller is configured to perform one or more operations comprising:
receiving a first access request via a first interface, wherein the first access request comprises a first access request type;
receiving a second access request via a second interface, wherein the second access request comprises a second access request type;
receiving a third access request via a third interface, wherein the third access request comprises a third access request type;
processing one or more of the first access request, the second access request and the third access request to authenticate an authorized electronic access code, an authorized user role and an authorized access request type according to one or more configuration settings;
actuating the electronic lock to the unlocked state in response to successfully authenticating the authorized electronic access code, the authorized user role and the authorized access request type according to the one or more configuration settings; and
overriding the one or more configuration settings in response to a first input from an electronic key.

8. The system of claim 7 wherein the electronic key is operably engaged with the controller to configure the one or more configuration settings.

9. The system of claim 7 wherein the one or more configuration settings comprise configurations for linking one or more user roles with one or more access request types.

10. The system of claim 9 wherein the one or more configuration settings comprise configurations for linking one or more access event types with the one or more user roles and the one or more access request types.

11. The system of claim 7 wherein the electronic key is operably engaged with the controller to update a firmware of the controller in response to a second input from the electronic key.

12. The system of claim 7 wherein the one or more operations further comprise receiving a sensor input from at least one sensor device, wherein the sensor input comprises a fourth access request type.

13. An electronic access control method, comprising:
configuring, with an input device communicably engaged with a controller of an electronic access control device, one or more configuration settings associated with the electronic access control device;
receiving, with the controller of the electronic access control device, a first access request comprising a first access request type;
receiving, with the controller of the electronic access control device, a second access request comprising a second access request type;
receiving, with the controller of the electronic access control device, a third access request comprising a third access request type;
processing, with the controller of the electronic access control device, one or more of the first access request, the second access request and the third access request to authenticate an authorized electronic access code, an authorized user role and an authorized access request type for the electronic access control device according to the one or more configuration settings;
actuating, with the controller of the electronic access control device, the electronic access control device from a locked state to an unlocked state in response to successfully authenticating the authorized electronic access code, the authorized user role and the authorized access request type according to the one or more configuration settings; and
receiving, with the controller of the electronic access control device, an alternative access request comprising an alternative access request type in response to unsuccessfully authenticating the authorized electronic access code, the authorized user role and the authorized access request type.

14. The method of claim 13 further comprising updating a firmware of the controller of the electronic access control device in response to receiving, with the controller of the electronic access control device, at least one input from an electronic key.

15. The method of claim 13 wherein the one or more configuration settings comprise configurations for linking one or more user roles with one or more access request types.

16. The method of claim 15 wherein the one or more configuration settings comprise configurations for linking one or more access event types with the one or more user roles and the one or more access request types.

17. The method of claim 13 further comprising receiving, with the controller of the electronic access control device, a sensor input from at least one sensor device, wherein the sensor input comprises a fourth access request type.

18. The apparatus of claim 1 wherein the one or more operations further comprise selecting or configuring a primary access type and a secondary or alternative access type for at least one user role.

19. The system of claim 7 wherein the one or more operations further comprise receiving an alternative access request comprising an alternative access request type in response to unsuccessfully authenticating the authorized electronic access code, the authorized user role and the authorized access request type.

20. The method of claim 13 wherein the one or more configuration settings comprise configurations for presenting a required combination of two or more of the first access request, the second access request and the third access request to the controller of the electronic access control device.

* * * * *